Aug. 19, 1952 A. PANKEN 2,607,862

DISPOSABLE ANTISEPTIC TELEPHONE MOUTHPIECE PROTECTOR

Filed Nov. 1, 1950

INVENTOR.
Albert Panken
BY
David Manley Heller
Attorney

Patented Aug. 19, 1952

2,607,862

UNITED STATES PATENT OFFICE 2,607,862

DISPOSABLE ANTISEPTIC TELEPHONE MOUTHPIECE PROTECTOR

Albert Panken, Chicago, Ill.

Application November 1, 1950, Serial No. 193,405

4 Claims. (Cl. 179—185)

My invention relates to disposable antiseptic telephone mouthpiece protectors.

An important object of my invention is to provide an article of the aforementioned character which may be instantly attached to, or removed from, the conventional mouthpiece transmitter of a telephone instrument.

Another object of my invention is to provide an article of the aforementioned character which is sprayed with an antispetic, or germicide, or bactericide, in order to prevent germs and bacteria from being communicated to persons utilizing a telephone instrument, especially such instruments located in public places.

A further object of my invention is to provide an article of the aforementioned character which is made of one piece of paper or like material, preferably a porous material, to retain the antiseptic or germicide with which it is to be sprayed.

Still a further object of my invention is to provide an article of the aforementioned character which is made from a single piece of material to fit configuratively the mouthpiece or transmitter section of a telephone.

A still further object of my invention is to provide an article of the aforementioned character having resilient reenforcing beaded means to permit it to encircle elastically the flange portion of the transmitter section of a telephone instrument.

A further and important object of my invention is to provide diaphragm means having elongated slots therein arranged in circular formations, and in staggered relationship, and in which any individual slotted portion will encompass the magnitude of a multiplicity of perforations in the transmitter portion of a telephone instrument.

A still further object of my invention is to provide an article of the aforementioned character which is disposable, and of such simple elemental construction as to warrant economical manufacture thereof in quantity production.

Other objects, ancillary advantages and novel features inherent in my invention will become apparent from an examination of the accompanying drawings bearing further elucidation in the ensuing description, wherein like symbols designate like parts, and in which.

Figure 3:
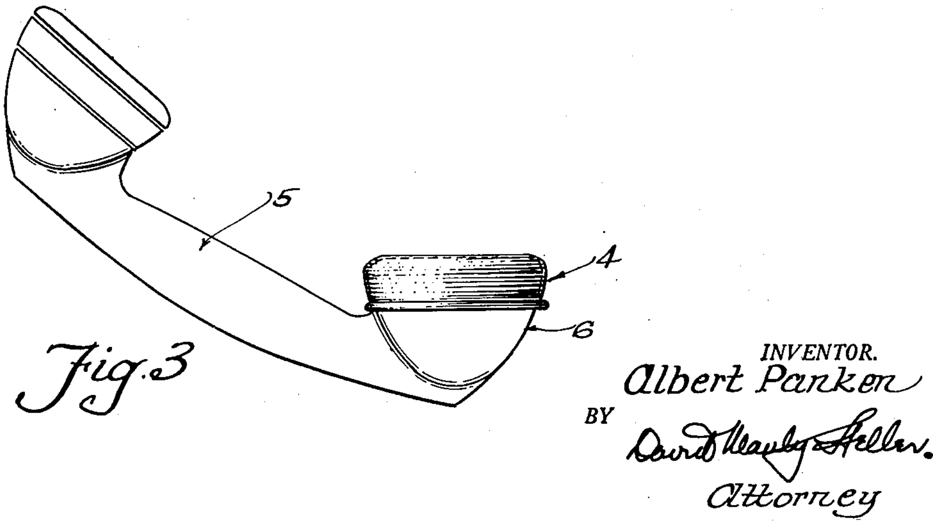
Fig. 3 is an elevational view showing the combination receiver and transmitter mechanism of a telephone instrument.

Referring to the various views, my invention is generally designated 4 and, as seen in Fig. 3, is shown draped over a transmitter 6 of a combined receiver and transmitter 5 of a telephone instrument.

Figure 1:
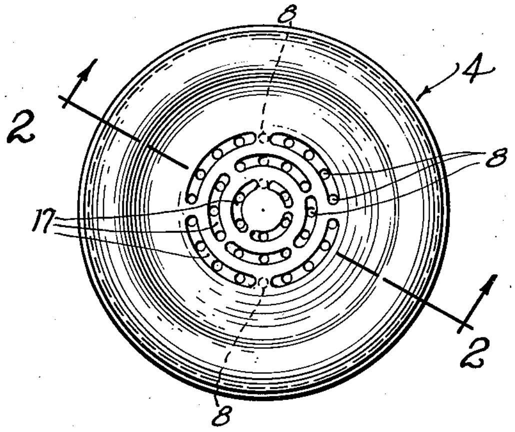
Fig. 1 represents a top view of my invention secured to the transmitter portion of a telephone instrument.
Figure 2:
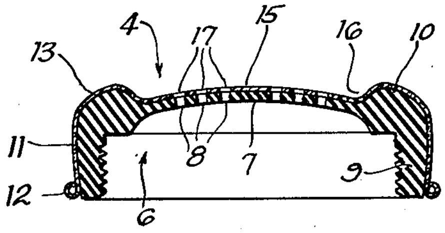
Fig. 2 is a cross-sectional view taken substantially on line 2—2 of Fig. 1.

Figures 1 and 2 show the detailed structure of my invention.

The telephone mouthpiece or transmitter, generally designated 6 consists of a hollow and threaded flange portion 9 which merges, at its outer peripheral edge at the top thereof, with a dome portion 10 of arcuate cross-sectional configuration connected to a convex dome portion 7 provided with perforations 8 to permit the sound waves to reach the functional elements of the telephone instrument.

My invention, generally, designated 4 consists of a cup-like element made of paper, or like material, having a skirt portion 11 fitting frictionally over a cylindrical flange portion 9 and having a dome-like portion 13 merging with the skirt portion 11 configuratively with the said dome portion 10 of the element 6, and at the center thereof having a diaphragm 15 of convex formation; all of said portions fitting configuratively and perimetrically over the respective portions of the said mouthpiece or transmitter. Resilient reenforcing beaded means 12 at the base of the skirt portion 11 furnishes an elastic quality to the element 4 so it may hold frictionally in engagement the flange portion 9.

The diaphragm 15 at its juncture with the dome portion 13 defines a concavity 16 which aids also in holding the cup-like element 4 attached firmly to the transmitter 6 by normal atmospheric pressure.

Slots 17 are an important feature of my invention and are best illustrated in Fig. 1 where it can be seen that any of said elongated arcuate slotted portions 17 encompass a multiplicity of holes 8 in the telephone transmitter 6. It is self-evident that the cup-like element 4 can be readily slipped over the telephone transmitter or removed therefrom.

A decided advantage in utilizing elongated slotted portions is that the cup-like element 4 may be assembled with the transmitter instantaneously without requiring registry with the holes 8. Thus, inconvenience is avoided, for if like perforations were used in the cup-like element 4, instead of the elongated slotted portions 17, the perforations in the cup-like element would have to be aligned in registry individually with each of the perforations 8 in the transmitter; thus loosening the fit of the cup-like element over the transmitter, hence rendering the entire invention ineffective and impractical for use.

Another important feature to be noted is that the diaphragm 15 of the cup-like element 4 is in intimate contact with the dome-shaped portion of the transmitter. If this condition were not present, and the diaphragm were at a distance from the dome portion of the transmitter, then sound wave reverberations and tonal disturbances would be generated which would impair the reproduction fidelity of the telephone instrument.

The construction of my invention is such as to make it economically useful inasmuch as it is disposable after each person's use, thus maintaining the transmitter 6 free from contamination by germs and bacteria which would be commmunicated from person to person successively using the telephone instrument. The cup-like elements can be arranged in dispensing devices adjacent the telephone instrument for use, the use thereof preventing the communication of colds and other ailments resulting from germs and bacteria deposited on the surface of the instrument by users.

Although I have herein described rather succinctly the nature and use of my invention so that persons skilled in the art will have no difficulty apprising themselves of the teachings thereof, and, inasmuch as the disclosure is susceptible of various alternations, modifications and improvements, I hereby reserve the right to all modifications, alterations and improvements falling within the scope and spirit of my invention, as well as any modifications that are embraced suggestively in the accompanying drawings, and any that may come within the purview of the foregoing description; my invention to be limited only by the appended claims.

Having thus disclosed and revealed my invention, what I claim as new and desire to secure by Letters Patent is:

1. A sanitary disposable telephone mouthpiece protector, comprising a cup-like element made of a single piece of material to fit configuratively the transmitter of a telephone instrument including a skirt portion, a dome portion merging therewith, a central convex diaphragm portion below the top portion of the said dome portion defining an annular concavity therebetween, and arcuately formed elongated slotted means on the said diaphragm portion.

2. A sanitary disposable telephone mouthpiece protector, comprising a cup-like element made of a single piece of material to fit configuratively the transmitter of a telephone instrument including a skirt portion, a dome portion merging therewith, a central convex diaphragm portion below the top portion of the said dome portion defining an annular concavity therebetween, and arcuately formed elongated slotted means on the said diaphragm portion, the said elongated slotted means being arranged concentrically and in staggered relationship.

3. A sanitary disposable telephone mouthpiece protector, comprising a cup-like element made of a single piece of material to fit configuratively the transmitter of a telephone instrument including a skirt portion, a dome portion merging therewith, a central convex diaphragm portion below the top portion of the said dome portion defining an annular concavity therebetween, and arcuately formed elognated slotted means on the said diaphragm portion, all surfaces of the said telephone mouthpiece protector being treated with an antiseptic preparation.

4. A sanitary disposable telephone mouthpiece protector, comprising a cup-like element made of a single piece of material to fit configuratively the transmitter of a telephone instrument including a skirt portion, a dome portion merging therewith, a central convex diaphragm portion below the top portion of the said dome portion defining an annular concavity therebetween, and arcuately formed elongated slotted means on the said diaphragm portion, the said elongated slotted means being arranged concentrically and in staggered relationship, all surfaces of the said telephone mouthpiece protector being treated with an antiseptic preparation.

ALBERT PANKEN.

REFERENCES CITED

The following references are of record in the file of this patent:

FOREIGN PATENTS

| Number | Country | Date |
|---|---|---|
| 425,595 | Great Britain | Feb. 21, 1934 |
| 458,852 | Great Britain | Sept. 23, 1935 |